United States Patent [19]

Tamaru et al.

[11] Patent Number: 4,728,944
[45] Date of Patent: Mar. 1, 1988

[54] COORDINATE POSITION DIGITIZING SYSTEM

[75] Inventors: Hideshi Tamaru, Sagamihara; Kunio Shikakura, Tokyo; Kimiyoshi Yoshida, Zushi; Akio Sakano, Ibaragi; Nobuo Kitamura, Sagamihara, all of Japan

[73] Assignee: Sony Corporation, Tokyo, Japan

[21] Appl. No.: 547,385

[22] Filed: Oct. 31, 1983

[30] Foreign Application Priority Data

Nov. 4, 1982 [JP] Japan ............................. 57-193707

[51] Int. Cl.[4] ............................................. G08C 21/00
[52] U.S. Cl. ..................................... 340/706; 178/18; 178/19
[58] Field of Search ............... 340/712, 706, 718, 708, 340/707, 814; 178/18, 19

[56] References Cited

U.S. PATENT DOCUMENTS

| 3,189,889 | 6/1965 | Brigett | 340/707 |
|---|---|---|---|
| 3,728,480 | 4/1973 | Baer | 340/709 |
| 3,873,770 | 3/1975 | Iannou | 178/18 |
| 4,022,971 | 5/1977 | Rodgers | 178/19 |
| 4,088,842 | 5/1978 | Ikedo | 178/19 |
| 4,093,947 | 6/1978 | Habeger, Jr. et al. | 178/18 |
| 4,206,314 | 6/1980 | Prugh et al. | 178/19 |
| 4,591,841 | 5/1986 | Gunderson et al. | 178/18 |

Primary Examiner—John W. Caldwell, Sr.
Assistant Examiner—Alvin Oberley
Attorney, Agent, or Firm—Hill, Van Santen, Steadman & Simpson

[57] ABSTRACT

A coordinate position digitizing system to be used with a cathode ray tube, comprises a position determining plate having a plurality of conductors extending parallel with one another at regularly spaced intervals, and driving means for supplying a constant current selectively to the conductors, one after another, within a horizontal scanning period of the cathode ray tube. Magnetic flux detecting means detects magnetic flux on the position determining plate, and a band pass filter eliminates a noise component resulting from the deflection magnetic field of the cathode ray tube. Positional data defining a position of the magnetic flux detecting means on the position determining plate is produced in response to the output of the band pass filter.

8 Claims, 6 Drawing Figures

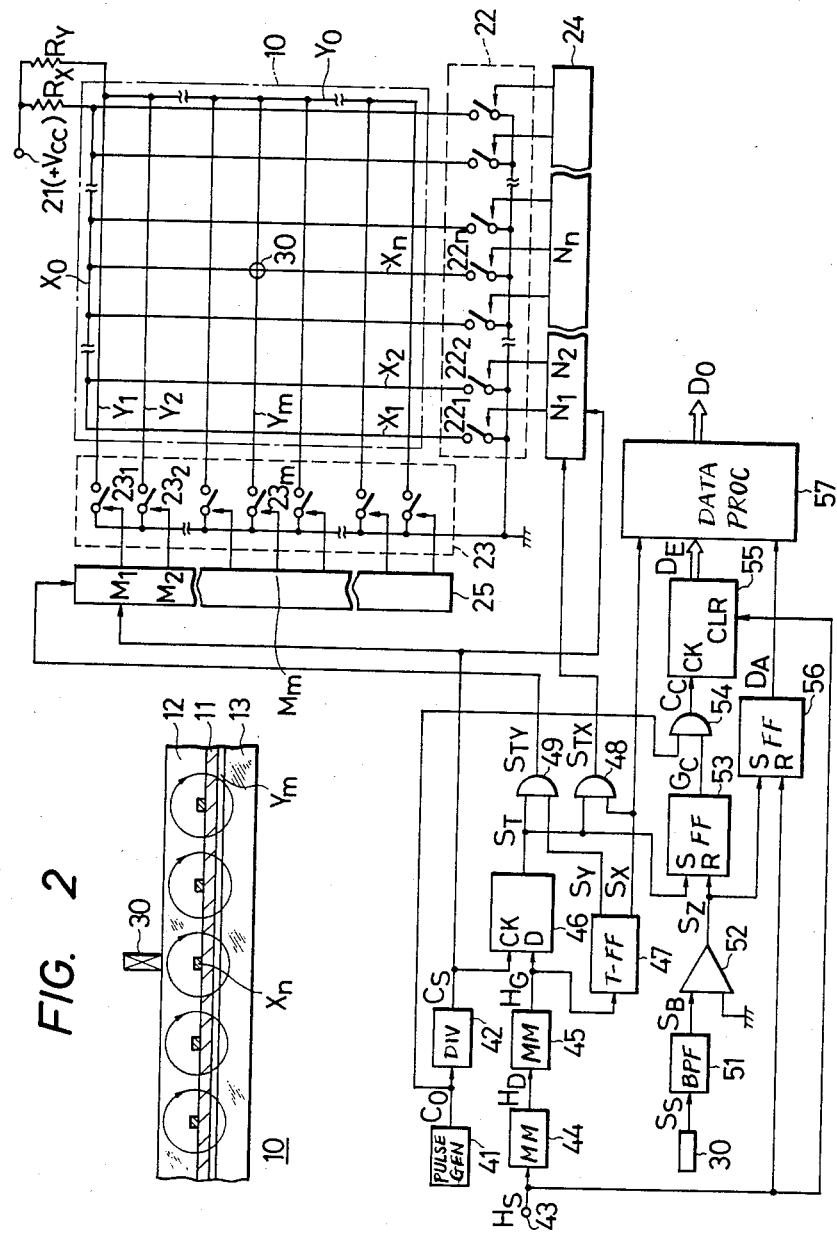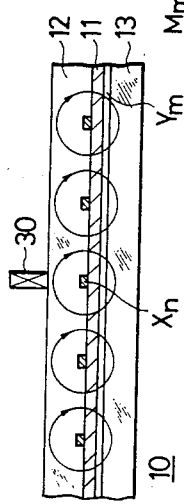
FIG. 1
FIG. 2

COORDINATE POSITION DIGITIZING SYSTEM

BACKGROUND OF THE INVENTION

This invention relates to coordinate position digitizing systems adapted to be employed in apparatus for displaying or creating figures. Data representing a figure drawn by a stylus on a tablet, which is disposed at a position close to a display device having a cathode ray tube, are obtained and are used for reproducing the figure thus drawn on the tablet, or for creating a required figure on the cathode ray tube, or for changing a display on the cathode ray tube.

There have been proposed several kinds of position determining system which are used in apparatus for displaying or creating figures containing a picture display device having a cathode ray tube, and each of which comprises a position determining plate forming a tablet disposed at a position close to the cathode ray tube and a stylus used for drawing figures on the position determining plate. In one of such position determining systems, a coordinate position digitizing system in which the position of the stylus on the position determining plate is magnetically detected has been already proposed by the assignee hereof.

In the coordinate position digitizing system proposed by the assignee, the position determining plate forming the tablet is provided thereon with a plurality of conductors extending parallel to one another at regularly spaced intervals to be supplied with a constant current during a constant short period one after another, and the stylus comprises magnetic flux detecting means operative to convert the magnetic flux produced in response to the current flowing through the conductors on the position determining plate into an electric signal, and the position of the magnetic flux detecting means forming the stylus on the position determining plate in the direction of arrangement of the conductors is detected in response to the signal from the magnetic flux detecting means.

The magnetic flux detecting means is embodied with a coil through which a current which is induced by a vertical component perpendicular to the surface of the position determining plate of the magnetic flux produced, in response to the current flowing through the conductors on the position determining plate. The amount of the vertical component of the magnetic flux detected by the magnetic flux detecting means varies in response to the distance to the conductor, through which the current is flowing, from the magnetic flux detecting means, and when the current flows through the conductors, every one in turn, the ouput signal obtained from the magnetic flux detecting means has its level varying in stepwise manner and varying to be positive from zero, then to be negative from positive through zero, and then to be zero from negative. In such case, the time having elapsed from an instant at which the conductor at the starting end of the position determining plate is supplied with the current, to another instant at which the output signal from the magnetic flux detecting means has a zero-crossover point (on the way to be, for example, negative from positive) corresponds to the position of the magnetic flux detecting means on the position determining plate in the direction of arrangement of the conductors. Accordingly, the position of the magnetic flux detecting means on the position determining plate in the direction of arrangement of the conductors is derived by measuring this time.

The coordinate position digitizing system as mentioned above is used with a cathode ray tube for displaying figures and the position determining plate thereof is placed at a location close to the cathode ray tub. Therefore, the position determining plate is affected by the deflection magnetic field provided to the cathode ray tube to cause horizontal and vertical electron beam scanning therein, and the magnetic flux detecting means detects not only the magnetic flux produced by the current flowing through the conductors on the position determining plate but also the magnetic flux of the deflection magnetic field. Consequently, the output signal from the magnetic flux detecting means contains a noise component resulting from the magnetic flux of the deflection magnetic field so as not to vary in such a manner as mentioned above during the term in which the constant current flows through the conductors one after another, and so the zero-crossover point does not correspond in practice to the actual position of the magnetic flux detecting means on the position determining plate in the direction of arrangement of the conductors. Since the magnetic flux of the deflection magnetic field varies rapidly during a horizontal blinking period and slowly and linearly during a horizontal scanning period in respect of the electron beam scanning in the cathode ray tube, the noise component contained in the output signal from the magnetic flux detecting means has a high frequency during the horizontal blanking period and a low frequency during the horizontal scanning period. As a result of this, erroneous positional data for digitizing a position on the position determining plate would be obtained by merely measuring the time having elapsed as mentioned above due to the noise component contained in the output signal from the magnetic flux detecting means.

OBJECTS AND SUMMARY OF THE INVENTION

It is an object of the present invention to provide an improved coordinate position digitizing system performing positional detection magnetically and being used with a cathode ray tube for displaying figures, which can avoid the above described problem encountered with the previously proposed system.

Another object of the present invention is to provide an improved coordinate position digitizing system employing a position determining plate having a plurality of conductors extending parallel thereon, supplied with a constant current one after another, and a magnetic flux detecting means for producing a signal concerning the position thereof on the position determining plate in response to the magnetic flux produced by the current flowing through the conductors on the position determining plate, which can avoid being harmfully affected by the deflection magnetic field provided to the cathode ray tube.

A further object of the present invention is to provide an improved coordinate position digitizing system employing a position determining plate having a plurality of conductors extending parallel thereon, supplied with a constant current, one after another, and a magnetic flux detecting means for producing a signal concerning the position thereof on the position determining plate in response to the magnetic flux produced by the current flowing through the conductors on the position determining plate, which can produce accurate positional data defining a position on the position determining plate.

According to an aspect of the present invention, there is provided a coordinate position digitizing system comprising a position determining plate having a plurality of conductors extending in parallel with one another at regularly spaced intervals thereon, driving and controlling means for supplying a constant current selectively to the conductors on the position determining plate, one after another, during a horizontal scanning period of a cathode ray tube magnetic flux detecting means movable on the position determining plate for detecting magnetic flux on the position determining plate to produce a signal in response to the detected magnetic flux, band pass filter means supplied with the signal from the magnetic flux detecting means for eliminating a noise component resulting from magnetic flux of the deflection magnetic field, from the signal supplied thereto from the magnetic flux detecting means, and information producing means for producing positional data defining a position of the magnetic flux detecting means on the position determining plate in the direction of arrangement of the conductors. The information producing means is operative to measure the time between an instant at which the conductor located at the starting end of the position determining plate is supplied with the constant current in the beginning of the horizontal scanning period to another instant at which an output of the band pass filter means crosses over a predetermined level in a predetermined direction, in order to produce the positional data.

With the coordinate position digitizing system thus constituted in accordance with the present invention, the noise component resulting from the magnetic flux of the deflection magnetic field provided to the cathode ray tube used with the system and contained in the output signal of the magnetic flux detecting means is eliminated before the output signal of the magnetic flux detecting means is used for obtaining positional data, so that positional data defining a proper position of the magnetic flux detecting means on the position determining plate can be obtained and therefore accurate positional detection can be performed.

The above, and other objects, features and advantages of the present invention will become apparent from the following detailed description thereof taken in conjunction with the accompanying drawings.

BRIEF DESCRIPTION OF THE DRAWINGS

FIG. 1 is a schematic representation of an embodiment of a coordinate position digitizing system according to the present invention;

FIG. 2 is a sectional view of an example embodying a position determining plate employed in the embodiment of FIG. 1;

DESCRIPTION OF THE PREFERRED EMBODIMENTS

Figure 3:
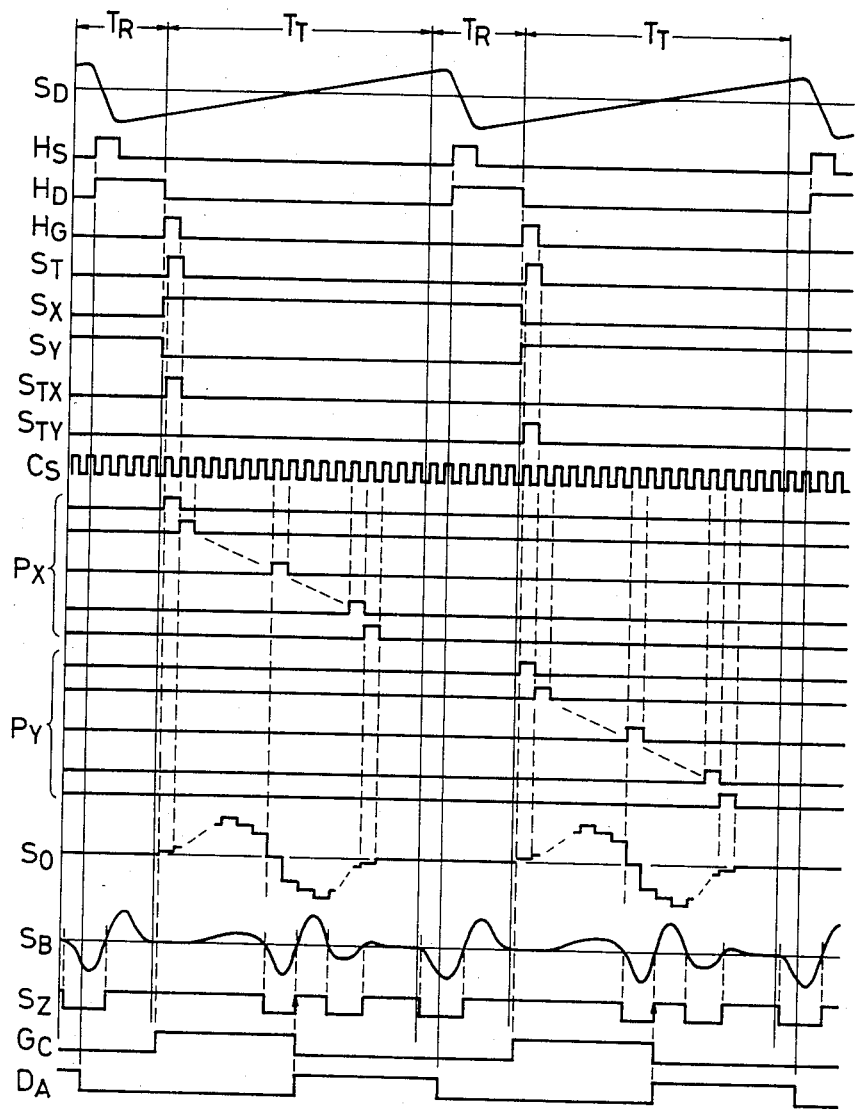
FIG. 3 shows waveforms used for explaining the operation of the embodiment of FIG. 1.

Now, one embodiment of coordinate position digitizing system according to the present invention will be explained with reference to FIGS. 1, 2 and 3.

FIG. 1 shows an example of a coordinate position digitizing system according to the present invention. In this example, a position determining plate 10, which forms a tablet and is disposed at a location close to a cathode ray tube for displaying figures, comprises, as shown also in FIG. 2, a thin transparent insulating board 11, a plurality of conductors $X_1$, $X_2$,—$X_n$ —arranged on one surface of the insulating board 11 to extend parallel to one another at regularly spaced intervals in the direction corresponding to the horizontal direction is respect of the cathode ray tube and each having one end connected to a common conductor $X_0$ provided also on the same surface of the insulating board 11, a plurality of conductors $Y_1$, $Y_2$,—$Y_m$ —arranged on the other surface of the insulating board 11 to extend in parallel to one another at regularly spaced intervals in the direction corresponding to the vertical direction in respect of the cathode ray tube and each having one end connected to a common conductor $Y_0$ provided also on the same surface of the insulating board 11, and transparent insulating layers 12 and 13 covering both surfaces of the insulating board 11, respectively. The common conductor $X_0$ is connected through a resistor $R_X$ to a terminal 21 supplied with a operation voltage $+V_{cc}$ and the other ends of the conductors $X_1$, $X_2$,—$X_n$ —are grounded through switches $22_1$, $22_2$,—$22_n$ —which form a driving circuit 22. Accordingly, when the switches $22_1$, $22_2$,—$22_n$ —are turned on selectively in turn, a constant current is supplied from the terminal 21 through the resistor $R_X$ and the common conductor $X_0$ to the conductors $X_1$, $X_2$,—$X_n$ —selectively one after another and magnetic flux surrounding each of the conductors $X_1$, $X_2$,—$X_n$ —are produced as shown in FIG. 2. Similarly, the common conductor $Y_0$ is connected through a resistor $R_Y$ to the terminal 21 and the other ends of the conductors $Y_1$, $Y_2$,—$Y_m$ —are grounded through switches $23_1$, $23_2$,—$23_m$ —which form a driving circuit 23. Accordingly, when the switches $23_1$, $23_2$,—$23_m$ —are turned on selectively in turn, a constant current is supplied from the terminal 21 through the resistor $R_Y$ and the common conductor $Y_0$ to the conductors $Y_1$, $Y_2$,—$Y_m$ —selectively one after another and magnetic flux surrounding each of the conductors $Y_1$, $Y_2$,—$Y_m$ —are produced.

A magnetic flux detecting means 30 which forms the stylus used for drawing figures on the position determining plate 10 is composed of a coil through which a current induced by a vertical component perpendicular to the surface of the position determining plate of the magnetic flux produced by the current flowing through the conductors $X_1$, $X_2$,—$X_n$ —or $Y_1$, $Y_2$,—$Y_m$ —flows when it is placed on the position determining plate 10.

From a clock pulse generating circuit 41, master clock pulses $C_0$ having a frequency of, for example, 100 MHz are obtained and supplied to a frequency dividing circuit 42 to be divided in frequency into one fortieth to produce clock pulses $C_S$ having a frequency of 2.5 MHz as shown in FIG. 3. The clock pulses $C_S$ are supplied to shift registers 24 and 25 as shift pulses.

In the meanwhile, a horizontal synchronous signal $H_S$ shown in FIG. 3 is derived from a scanning circuit provided in connection with tne cathode ray tube and supplied through a terminal 43 to a monostable multivibrator 44. This monostable multivibrator 44 produces a signal $H_D$ having a rising edge coinciding with the front edge of the horizontal synchronous signal $H_S$ appearing in a horizontal blanking period $T_R$ and a falling edge at the beginning end of a horizontal scanning period $T_T$ appearing after a predetermined time has passed, as shown in FIG. 3. The signal $H_D$ is supplied to a monostable multivibrator 45 and a signal $H_G$ having a rising edge at the beginning end of the horizontal scanning period $T_T$, at which the signal $H_D$ has its falling edge, and a falling edge at an instant coming after a period of one cycle of the clock pulses $C_S$ has passed, as shown in FIG. 3, is obtained from the monostable multivibrator 45. This signal $H_G$ is supplied to a data terminal D of a D-flip flop 46 which has a clock terminal CK supplied with the clock pulses $C_S$ and a signal $S_T$ having a rising edge coinciding with the rising edge of the clock pulses $C_S$ appearing immediately after the rising edge of the signal $H_G$ and a falling edge coinciding with the falling edge of the clock pulse $C_S$ appearing immediately after the falling edge of the signal $H_G$, as shown in FIG. 3, is obtained from the D-flip flop 46. Further, the signal $H_G$ obtained from the monostable multivibrator 45 is supplied to a T-flip flop 47, and a signal $S_X$ taking a high level during every other horizontal period (comprised of a horizontal scanning period and a horizontal blanking period) and a low level during another every other horizontal period and a signal $S_Y$ taking the low level as shown in FIG. 3 and the high level alternately in the manner opposite to the signal $S_X$ as shown in FIG. 3 are obtained from the T-flip flop 47.

Then, the signal $S_T$ obtained from the D-flip flop 46 and the signal $S_X$ obtained from the T-flip flop 47 are supplied to an AND gate 48 so that the signal $S_T$ is extracted every other horizontal period to the output of the AND gate 48 to produce a signal $S_{TX}$. The signal $S_{TX}$ is supplied to the shift register 24 as a starting pulse. Similarly, the signal $S_T$ obtained from the D-flip flop 46 and the signal $S_Y$ obtained from the T-flip flop 47 are supplied to an AND gate 49 so that the signal $S_T$ is extracted another every other horizontal period to the output of the AND gate 49 to produce a signal $S_{TY}$. The signal $S_{TY}$ is supplied to the shift register 25 as a starting pulse.

Accordingly, in a certain horizontal period, pulses which appear successively with a constant pulse width identical to a period of one cycle of the clock pulses $C_S$, as shown with reference $P_X$ on the whole in FIG. 3, are obtained at output terminals $N_1, N_2, —N_n$ —of the shift register 24 during the horizontal scanning period $T_T$ period $T_T$ therein, respectively. These pulses $P_X$ are supplied to the corresponding switches $22_1, 22_2—22_n$ —in the driving circuit 22, respectively, so that the switches $22_1, 22_2,—22_n$ —are turned on successively. Consequently, the constant current flows selectively through the conductors $X_1, X_2,—X_n$ —on the position determining plate 10 one after another during the period of one cycle of the clock pulses $C_S$ for each of them and thereby the magnetic flux surrounding the conductors $X_1, X_2,—X_n$ —one after another is procured. Similarly, in the next horizontal period, pulses which appear successively with the constant pulse width identical to the period of one cycle of the clock pulse $C_S$, as shown with reference $P_Y$ on the whole in FIG. 3, are obtained at output terminals $M_1, M_2,—M_m$ —of the shift register 25 during the horizontal scanning period $T_T$ therein, respectively. These pulses $P_Y$ are supplied to the corresponding switches $23_1, 23_2,—23_m$ —in the driving circuit 23, respectively, so that the switches $23_1, 23_2,—23_m$ —are turned on successively. Consequently, the constant current flows selectively through the conductors $Y_1, Y_2—Y_m$ —on the position determining plate 10 one after another during the period of one cycle of the clock pulses $C_S$ for each of them and thereby the magnetic flux surrounding the conductors $Y_1, Y_2,—Y_m$ —one after another is obtained.

The vertical component of the magnetic flux thus produced by the current flowing through the conductors $X_1, X_2,—X_n$ —or $Y_1, Y_2,—Y_m$ —is detected by the magnetic flux detecting means 30. However, in such case, the magnetic flux on the deflection magnetic field provided to the cathode ray tube is also detected by the magnetic flux detecting means 30 together with the vertical component of the magnetic flux produced by the current flowing through the conductors $X_1, X_2,—X_n$ —or $Y_1, Y_2,—Y_m$ —. Accordingly, an output signal $S_S$ obtained from the magnetic flux detecting means 30 contains a signal component $S_0$ obtained in response to the detected vertical component of the magnetic flux produced by the current flowing through the conductors $X_1, X_2,—X_n$ or $Y_1, Y_2,—Y_m$ —and a noise component $S_D$ obtained in response to the detected magnetic flux of the deflection magnetic field.

The noise component $S_D$ thus produced varies rapidly and has a relatively high frequency in the horizontal blanking period $T_R$ and, on the other hand, varies slowly and linearly and has a relatively low frequency in the horizontal scanning period $T_T$, as shown in the uppermost side of FIG. 3. The signal component $S_0$ obtained as above varies in stepwise manner every period of one cycle of the clock pulses $C_S$ to be, for example, positive from zero, then to be negative from positive through zero and to be zero from negative during the period in which the constant current flows through the conductors $X_1, X_2,—X_n$ —or $Y_1, Y_2,—Y_m$ —in the horizontal scanning period $T_T$, as shown in the lower portion of FIG. 3. Besides, the time having elapsed from an instant at the beginning of the horizontal scanning period $T_T$ at which the first conductors $X_1$ or $Y_1$ located at the starting end of the position determining plate 10 is supplied with the constant current, to an instant at which the signal component $S_0$ has the zero-crossover point on the way to be negative from positive, corresponds to the position of the magnetic flux detecting means 30 on the position determining plate 10 in the direction of arrangement of the conductors $X_1, X_2,—X_n$ —in the certain horizontal period as mentioned above and to the position of the magnetic flux detecting means 30 on the position determining plate 10 in the direction of arrangement of the conductors $Y_1, Y_2,—Y_m$ —in the next horizontal period.

The output signal $S_S$ from the magnetic flux detecting means 30 is supplied to a band pass filter 51 which is selected to have a pass band with a central frequency of, for example, 400 kHz which is lower than the frequency (2.5 MHz) of the clock pulses $C_S$. As a result of this, the noise component $S_D$ is eliminated at the band pass filter 51 and only a signal component having the frequency of 400 kHz within the signal component $S_0$ is derived from the band pass filter 51 in the horizontal scanning period $T_T$. An output signal $S_B$ as shown in the lower portion of FIG. 3 of the band pass filter 51 is supplied to a voltage comparator 52 forming a zero-crossover point detecting circuit, and a signal $S_Z$ having a falling edge at an instant at which the signal $S_B$ has a zero-crossover point on the way to negative from positive and a rising edge at an instant at which the signal $S_B$ has another zero-crossover point on the way to postive from negative, as shown in the lower portion of FIG. 3, is obtained from the voltage comparator 52. Then, the signal $S_T$ obtained from the D-flip flop 46 and the signal $S_Z$ obtained from the voltage comparator 52 are supplied to a set terminal S and a reset terminal R of an S-R flip flop 53, and a signal $G_C$ which has a rising edge coinciding with the rising edge of the signal $S_T$ and a falling edge coinciding with the rising edge of the signal $S_Z$ in the horizontal scanning period $T_T$, which is indicated by a upward arrow in FIG. 3, is obtained from the S-R flip flop 53.

The instant, at which the output signal $S_B$ obtained from the band pass filter 51 first has its zero-crossover point on the way from positive to negative in the horizontal scanning period $T_T$, is determined in response to the instant at which the signal component $S_0$ has its zero-crossover point on the way to be negative from positive, though the former is delayed by a predetermined time compared with the latter, and therefore the time having lapsed from the rising edge to the falling edge of the signal $G_C$ obtained from the S-R flip flop 53 corresponds to the position of the magnetic flux means 30 on the position determining plate 10 in the direction of arrangement of the conductors $X_1, X_2, -X_n$ —in the certain horizontal period as mentioned above and to the position of the magnetic flux detecting means 30 on the position determining plate 10 in the direction of arrangement of the conductors $Y_1, Y_2, -Y_m$ —in the next horiontal scanning period.

The master clock pulses $C_0$ having the frequency of 100 MHz obtained from the clock pulse generating circuit 41 and the signal $G_C$ obtained from the S-R flip flop 53 are supplied to an AND gate 54, and the master clock pulses $C_C$ with the number corresponding to the position of the magnetic flux detecting means 30 on the position determining plate 10 in the direction of arrangement of the conductors $X_1, X_2, -X_n$ —or $Y_1, Y_2, -Y_m$ —are extracted at the AND gate 54 during the period in which the signal $G_C$ takes a high level. While, the horizontal synchronous signal $H_S$ is supplied through the terminal 43 to a clear terminal CLR of a counter 55 and the counter 55 is cleared by the front edge of the horizontal synchronous signal $H_S$ appearing in the horizontal blanking period $T_R$. After clearing the counter 55, the master clock pulses $C_C$ extracted at the AND gate 54 are supplied to a clock terminal CK of the counter 55 and counted therein. Accordingly, output data $D_E$ obtained from the counter 55 represent the position of the magnetic flux detecting means 30 on the position determining plate 10 in the direction of arrangement of the conductors $X_1, X_2, -X_n$ —during a period from the falling edge of the signal $G_C$ appearing in the horizontal scanning period $T_T$ in one of alternate horizontal periods to the front edge of the horizontal synchronous signal $H_S$ appearing in the horizontal blanking period $T_R$ in the next horizontal period, and also represent the position of the magnetic flux detecting means 30 on the position determining plate 10 in the direction of arrangement of the conductors $Y_1, Y_2, -Y_m$ —during a period from the falling edge of the signal $G_C$ appearing in the horizontal scanning period $T_T$ in one of another alternate horizontal periods to the front edge of the horizontal synchronous signal $H_S$ appearing in the horizontal blanking period $T_R$ in the next horizontal period.

The horizontal synchronous signal $H_S$ and the signal $S_Z$ obtained from the voltage comparator 52 are supplied to a reset terminal R and a set terminal S of a S-R flip flop 56, respectively, and a signal $D_A$ which takes a high level during each period in which the output data $D_E$ obtained from the counter 55 represent the position of the magnetic flux detecting means 30 on the position determining in plate 10, as shown in the lowermost side of FIG. 3, is obtained from the S-R flip flop 56.

Then, the signals $S_X$ and $S_Y$ which are obtained from the flip flop 47 to indicate alternate horizontal periods in which the position of the magnetic flux detecting means 30 on the position determining plate 10 in the direction of arrangement of the conductors $X_1, X_2, -X_n$ —is detected and another alternate horizontal periods in which the position of the magnetic flux detecting means 30 on the position determining plate 10 in the direction of arrangement of the conductors $Y_1, Y_2, -Y_m$ —is detected, respectively, the output data $D_E$ from the counter 55, and the signal $D_A$ from the S-R flip flop 56 are supplied to a data processing circuit 57, and positional data $D_0$ defining the positions of the magnetic flux detecting means 30 on the position determining plate 10 in the direction of arrangement of the conductors $X_1, X_2, -X_n$ —and the direction of arrangement of the conductors $Y_1, Y_2, -Y_m$ —are obtained from the data processing circuit 57.

In the embodiment mentioned above, it is necessary to detect the horizontal scanning period in respect of the cathode ray tube used with the system of the embodiment and, for the purpose of this, the horizontal synchronous signal $H_S$ is derived from the scanning circuit provided in connection with the cathode ray tube and supplied to the terminal 43. It is generally considered to make a wire connection between the system and the television circuit provided in connection with the cathode ray tube in order to derive the horizontal synchronous signal from the scanning circuit and supply it to the system. However, in such a case, it is required to modify a display device employing the cathode ray tube and the scanning circuit therein so as to have an output terminal from which the horizontal synchronous signal can be derived or to use a specific display device which employs the cathode ray tube and the scanning circuit therein and is provided originally with a terminal to which an outer connection can be made to derive the horizontal synchronous signal therefrom.

Figure 4:
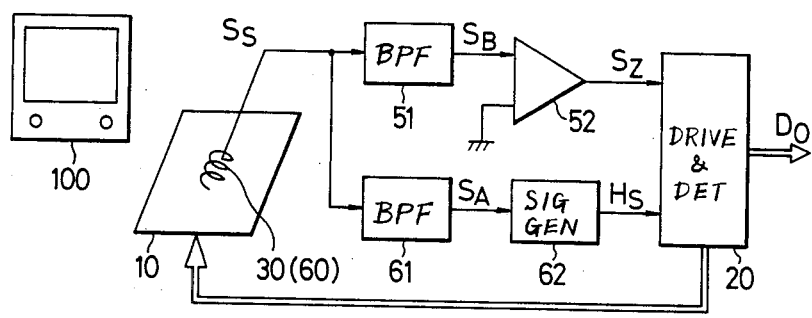
FIGS. 4, 5 and 6 are schematic partial representations of other embodiments of coordinate position digitizing system according to the present invention.
Figure 5:
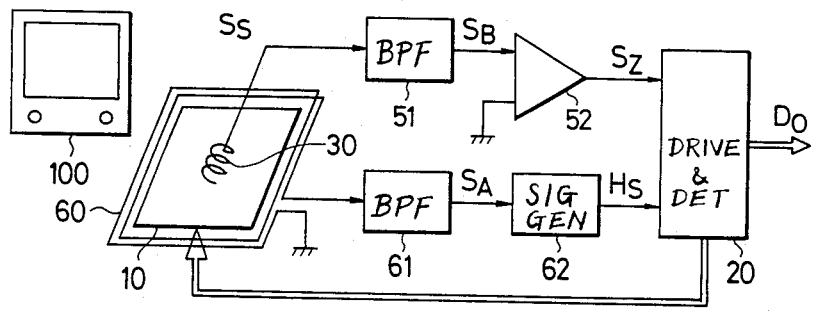

FIGS. 4 and 5 show portions of other embodiments of coordinate position digitizing system according to the present invention. In the case of each of these embodiments, a display device employing a cathode ray tube and a scanning circuit provided for performing vertical and horizontal electron beam scanning in the cathode ray tube can be used in cooperation with the system of the embodiment without modifications thereto. In FIGS. 4 and 5, elements, blocks, parts and signals corresponding to those of FIG. 1 are marked with the same references and further description thereof will be omitted.

In the embodiment of FIG. 4, the magnetic flux detecting means 30 acts also as detecting means 60 for detecting the horizontal scanning period. The position determining plate 10 is disposed at a location close to a display device 100 which employs a cathode ray tube for displaying figures. When the magnetic flux detecting means 30 is set on the position determining plate 10 to draw a figure, the magnetic flux detecting means 30 is electromagnetically connected with the display device 100 to detect the magnetic flux of the deflection magnetic field provided to the cathode ray tube employed in the display device and the horizontal scanning period in respect of the cathode ray tube is detected on the strength of the signal $S_S$ obtained from the magnetic flux detecting means 30. The signal $S_S$ is supplied to a band pass filter 61 which has a pass band with the central frequency of, for example, 100 kHz and Q factor of, for example, 0.5 and a signal $S_A$ having a sine waveform in the horizontal scanning period $T_R$ in the display device is obtained from the band pass filter 61. This signal $S_A$ is supplied to a synchronous signal generating circuit 62 to produce the horizontal synchronous signal $H_S$ thereat.

In the embodiment of FIG. 5, the detecting means 60 which is electro-magnetically connected with the display device 100 to detect the horizontal scanning period is respect of the cathode ray tube is provided individually in the form of a coil surrounding the position determining plate 10.

Further, the detecting means 60 may be embodied in such a form as a telephone pick-up device which has a sucker to be attached to a telephone thereby and attached to a housing of the display device 100 by a sucker provided thereto, though it is not shown in the drawings.

As mentioned above, in the case of the embodiment of FIG. 4 or 5, the horizontal synchronous signal $H_S$ is derived from the display device 100 employing the cathode ray tube in a wireless manner and therefrom the display device 100 is not required to have any modification.

In the embodiments of FIGS. 4 and 5, the synchronous signal generating circuit 62 for obtaining the horizontal synchronous signal $H_S$ from the signal $S_A$ obtained from the band pass filter 61 can be formed fundamentally into a voltage comparator in which the signal $S_A$ is compared with a predetermined reference voltage. However, if the magnetic flux of the deflection magnetic field in the display device 100 is not detected by the detecting means 60 owing to the position of the detecting means 60 distant from the display device 100 and therefore the signal $S_A$ with effective level is not obtained from the band pass filter 61 in the horizontal blanking period $T_R$, the synchronous signal generating circuit 62 formed into such a voltage comparator as mentioned above can not produce any output signal and, as a result of this, a driving and detecting portion 20 for controlling the driving circuits 22 and 23 and producing the positional data $D_E$ can not be operative. Accordingly, in the case of the system employing such detecting means 60 as constituted as shown in FIG. 4 or 5, it is desirable that the synchronous signal generating circuit 62 is constituted to be operative to supply a predetermined synchronous signal in place of the horizontal synchronus signal $H_S$ when the signal $S_A$ with effective level is not obtained in the horizontal blanking period $T_R$.

Figure 6:
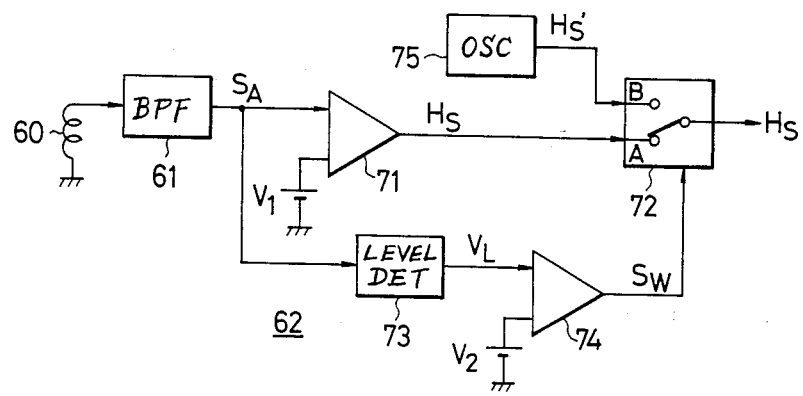

FIG. 6 shows an example of the synchronous signal generating circuit 62 constituted to supply such a predetermined synchronous signal as mentioned above. In this example, the signal $S_A$ obtained from the band pass filter 61 is supplied to a voltage comparator 71 to be compared with a constant reference voltage $V_1$ therein. The output signal of the voltage comparator 71 is supplied to one input terminal A of a switch 72 and a signal $H_S'$ having a frequency equal to the horizontal frequency in the display device 100 and obtained from a oscillating circuit 75 is supplied to the other input terminal B of the switch 72. The signal $S_A$ is also supplied to a level detecting circuit 73 and a voltage $V_L$ of the detected level obtained from the level detecting circuit 73 is supplied to a voltage comparator 74 to be compared with a constant reference voltage $V_2$ therein. An signal $S_W$ obtained from the voltage comparator 74 is supplied to the switch 72 as a switching signal. When the level of the signal $S_A$ is enough to produce the horizontal synchronous signal $H_S$ at the output of the voltage comparator 71 and the signal $S_W$ from the voltage comparator 74 takes, for example, a high level, the switch 72 is turned to select the input terminal A so that the horizontal synchronous signal $H_S$ obtained from the voltage comparator 71 is derived as an output signal of the synchronous signal generating circuit 62. On the other hand, when the level of the signal $S_A$ is not effective to produce the horizontal synchronous signal $H_S$ and signal $S_W$ takes a low level, the switch 72 is turned to select the input terminal B so that the signal $H_S'$ obtained from the oscillating circuit 75 is derived as an output of the synchronous signal generating circuit 62.

Further, another example of the synchronous signal generating circuit 62 may be constituted a voltage comparator for comparing the signal $S_A$ obtained from the band pass filter 61 with a reference voltage and a synchronous oscillator supplied with an output signal of the voltage comparator so as to be operative in such a manner that when the horizontal synchronous signal is obtained from the voltage comparator, the synchronous oscillator works in synchronism with the obtained horizontal synchronous signal, and when the horizontal synchronous signal is not obtained from the voltage comparator, the synchronous oscillator is in free oscillation to produce a signal having the horizontal frequency.

What is claimed is:

1. A coordinate position digitizing system comprising a cathode ray tube for displaying figures, beam deflecting means for causing an electron beam in said cathode ray tube to scan in synchronism with vertical and horizontal synchronizing signals, a position determining plate means juxtaposed with said cathode ray tube and having a plurality of conductors extending parallel with one another at regularly spaced intervals thereon, driving and controlling means for supplying a current selectively to the conductors of said plurality of on said position determining plate, one after another, consecutively within each horizontal scanning period of said cathode ray tube, magnetic flux detecting means juxtaposed with said position determining plate for detecting magnetic flux on said position determining plate and producing a signal in response to the detected magnetic flux, a band-pass filter means for extracting a signal component having a frequency higher than the frequency of a noise component obtained in response to the beam deflecting means of said cathode ray tube from the signal produced by said magnetic flux detecting means, and information producing means connected to said filter means for producing positional data defining a position of said magnetic flux detecting means on said position determining plate at a first instant during the operation controlled by said driving and controlling means between horizontal blanking periods and during a horizontal scanning period of said beam deflecting means and also at a second instant at which the signal component from said band-pass filter first crosses over a predetermined level in a predetermined direction in the same horizontal scanning period.

2. A system according to claim 1 wherein said driving and controlling means comprises means for controlling the current to be supplied to one of the conductors located at the starting end of said position determining plate at said first instant.

3. A system according to claim 2 wherein said information producing means comprises time measuring means for measuring the time elapsed from said first instant to said second instant, and means for deriving said positional data in response to the output of said time measuring means.

4. A system according to claim 3 wherein said time measuring means comprises a counter starting its counting operation at said first instant and stopping its counting operation at said second instant.

5. A system according to claim 1 further comprising additional detecting means for detecting the horizontal scanning period of said cathode ray tube.

6. A system according to claim 5 wherein said additional detecting means comprises said magnetic flux detecting means, an additional band-pass filter for extracting a signal component, resulting from magnetic flux of a magnetic field from said beam deflecting means of said cathode ray tube, from the signal produced by said magnetic flux detecting means, and means for deriving said horizontal synchronizing signals in response to the signal component extracted by said additional band-pass filter.

7. A system according to claim 5 wherein said additional detecting means comprises additional magnetic flux detecting means for detecting magnetic flux of a magnetic field from said beam deflecting means of said cathode ray tube and producing an additional signal in response to the detected magnetic flux thereby, and means for deriving said horizontal synchronizing signals in response to the additional signal from said additional magnetic flux detecting means.

8. A system according to claim 7 wherein said additional magnetic flux detecting means comprises a coil provided to surround said position determining plate.

* * * * *